No. 724,351. PATENTED MAR. 31, 1903.
L. STEINBERGER.
INSULATED STRAIN.
APPLICATION FILED AUG. 25, 1902.
NO MODEL.

WITNESSES:
Edward Thorpe.
Walton Harrison

INVENTOR
Louis Steinberger
BY
ATTORNEYS.

UNITED STATES PATENT OFFICE.

LOUIS STEINBERGER, OF BROOKLYN, NEW YORK.

INSULATED STRAIN.

SPECIFICATION forming part of Letters Patent No. 724,351, dated March 31, 1903.

Application filed August 25, 1902. Serial No. 120,978. (No model.)

*To all whom it may concern:*

Be it known that I, LOUIS STEINBERGER, a citizen of the United States, and a resident of the city of New York, borough of Brooklyn, in the county of Kings and State of New York, have invented new and useful Improvements in Insulated Strains, of which the following is a full, clear, and exact description.

My invention relates to insulated strains, more particularly of the kind commonly designated as "globe-strains."

I will describe an insulated strain embodying my invention and then point out the novel features in the appended claims.

Reference is to be had to the accompanying drawings, forming a part of this specification, in which similar characters of reference indicate corresponding parts in all the figures.

Figure 1:
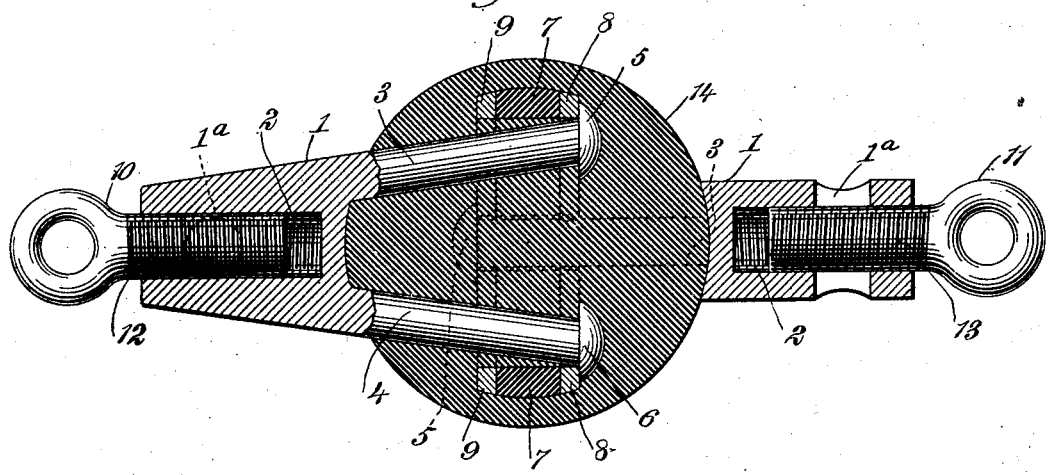
Figure 2:
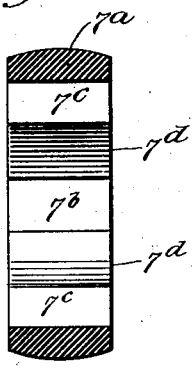
Figure 3:
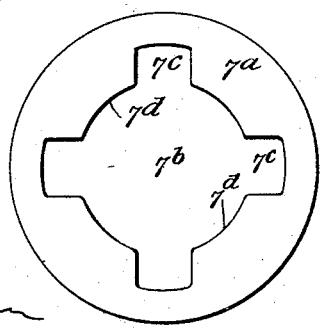

Figure 1 is a sectional view of a strain equipped with my invention. Fig. 2 is a sectional view of an interiorly-mutilated ring of insulating material used for insulating metallic parts from each other, and Fig. 3 is an elevation of the ring shown in Fig. 2.

A pair of substantially V-shaped links 1, each provided with a threaded aperture 2 and with a pair of longitudinal shanks 3 4, terminating in heads 5 6, are insulated from each other and are provided with suitable means for taking up and letting out the slack of the suspension-wire. An interiorly-mutilated ring 7, of insulating material, sandwiched between a pair of interiorly-mutilated rings 8 9, preferably of tough metal, and the links 1 1 are passed in opposite directions through the composite annular member thus formed. If desired, a solid ring $7^a$ of insulating material may be employed instead of the composite ring above mentioned. The solid ring $7^a$ has the same general conformity as the composite ring. The ring, whether composite or otherwise, is provided centrally with a substantially circular opening $7^b$ and with a number of substantially square apertures $7^c$, separated from each other by sectors $7^d$, integral with the other parts of the ring.

To place the link within the ring, the small end of each link is inserted through the opening $7^b$, and the link is drawn through until the shanks 3 4 engage the oppositely-disposed apertures $7^c$, the heads 5 6 being then in contact with one of the faces of the ring. The other link 1 is then inserted into place from the opposite side of the ring, the general plane formed by the diverging shanks 3 4 being at right angles to that of the shanks of the link first inserted. The link inserted last may be tilted slightly for the purpose of facilitating the entry of the last link, the parts being in place, as just described. Plastic insulating material is poured or molded around the ring and caused to cover the shanks 3 4 and the heads 5 6. This plastic insulating material is then molded in the form of a ball or globe, as indicated in Fig. 1, or into any other shape desired. Eyebolts 10 11, each provided, respectively, with threads 12 13, are next screwed into the threaded apertures 2. One of these apertures is provided with a right-hand thread and the other with a left-hand thread. Similarly the thread of one of the bolts is right hand, and the other left hand, so that when the eyebolts are screwed partially into their respective sockets the entire device acts as a turnbuckle. Longitudinal wires or conductors now being secured to the eyebolts 10 11, the globe 14 may be used as a handle for rotating the central parts of the device, thus causing the eyebolts to approach or recede from each other within reasonable limits, thereby causing the device to serve as a turnbuckle, as well as an insulating strain.

Each link 1 is provided with a cylindrical aperture $1^a$. Either or both of the bolts 10 11 may be omitted, and the hanger-wires or other suspension devices may directly engage one or both of the apertures $1^a$. When both links are thus used, the strain does not act as a turnbuckle and is not extensible.

My invention admits of a variety of uses, as will be understood by a person skilled in the art to which it relates. The strain possesses great tensile strength and admits of considerable adaptability in use.

The structure of the strain is such that all of the metal parts may be made of drop-forged steel or of other preferred metal, thus obtaining a maximum of strength with a minimum of weight and a minimum of complication and an absolute certainty of insulation.

Having thus described my invention, I claim as new and desire to secure by Letters Patent—

1. An insulated strain, comprising a ring of insulating material provided with internal mutilations, a pair of annular washers, provided with mutilations mating those of said ring, link members provided with suspension devices and with shanks engaging the mutilations of the respective washers and also engaging the mutilations of the ring, said link members being further provided with heads engaging the respective washers directly, and a mass of insulating material enveloping said ring, said washers and portions of said link members.

2. An insulated strain, comprising a pair of links provided with threaded sockets and insulated from each other, a mass of insulating material enveloping portions of said links and forming a handle, and threaded eyebolts engaging said sockets.

3. An insulated strain, comprising a pair of links provided with threaded sockets and seprated from each other by an insulating-plate having internal mutilations, a mass of insulating material mounted upon said insulating-plate and upon portions of said links, said mass of insulating material being formed into a handle, and threaded eyebolts engaging said sockets.

4. An insulated strain, comprising a member of insulating material provided with internal mutilations, a pair of substantially V-shaped links of metal, provided with heads engaging said mutilations, said links being also provided with threaded sockets, threaded eyebolts engaging said sockets, and a mass of insulation enveloping said mutilated member and portions of said V-shaped links, said mass of insulating material having the conformity of a handle.

5. An insulating strain, comprising a ring of insulating material provided with internal mutilations, a pair of annular washers provided with internal mutilations mating those of said ring, link members provided with shanks engaging the mutilations of the ring and of the respective washers, said link members being further provided with heads engaging said washers directly, insulating material enveloping said disk, said washer and portions of said link members but leaving said sockets exposed, and eyebolts provided with threads of different hand, said bolts engaging said sockets, the arrangement being such that said mass of insulating material may be used as a handle for rotating said sockets relatively to said eyebolts.

6. An insulated strain, comprising an annular member of insulating material, provided internally with mutilations, links provided with heads for engaging said annular member, and with shanks for engaging said mutilations, and an insulating material enveloping said annular member and portions of said links.

7. An insulated strain, comprising a pair of links each provided with a threaded socket and with an aperture, means for connecting said links together while insulating them from each other, and extensible eyebolts removably mounted within said sockets, the arrangement being such that the strain may be rendered non-extensible by merely omitting the bolts.

8. An insulated strain, comprising a pair of links each provided with an aperture whereby the same may be suspended, an extensible bolt removably secured upon each link and provided with an eye whereby said link may be suspended and means for connecting said links together while insulating them from each other, the arrangement being such that the strain is convertible and may at will be rendered extensible or non-extensible.

9. An insulated strain, comprising an annular member of insulating material provided internally with mutilations, links provided with heads for engaging said annular member, and with shanks for engaging said mutilations and having apertures for suspension, and an insulating material enveloping said annular member and portions of said links.

In testimony whereof I have signed my name to this specification in the presence of two subscribing witnesses.

LOUIS STEINBERGER.

Witnesses:
   JNO. M. RITTER,
   WALTON HARRISON.